United States Patent [19]

Bryne et al.

[11] Patent Number: 4,887,465
[45] Date of Patent: Dec. 19, 1989

[54] TRANSDUCERS FOR HOSTILE ENVIRONMENTS

[75] Inventors: John V. Bryne, Dublin; Francis McMullin, Clare, both of Ireland

[73] Assignee: Kollmorgen Corporation, Simsbury, Conn.

[21] Appl. No.: 49,578

[22] Filed: May 14, 1987

[30] Foreign Application Priority Data

May 16, 1986 [IE] Ireland .................................. 1305/86

[51] Int. Cl.⁴ ...................... G01F 23/36; G01F 23/60; G01F 23/72
[52] U.S. Cl. ........................................ 73/313; 73/322; 324/208; 336/136; 340/870.31
[58] Field of Search ........... 73/290, 322, 313, DIG. 5; 324/207, 208; 340/870.31, 624; 336/75, 79, 87, 120, 123, 136

[56] References Cited

U.S. PATENT DOCUMENTS

| | | |
|---|---|---|
| 2,370,099 | 2/1945 | Werder .................................. 73/313 |
| 2,424,766 | 7/1947 | Miner .................................. 73/313 X |
| 3,484,678 | 12/1969 | Church . |
| 4,006,637 | 2/1977 | Kinosita .................................. 73/313 |
| 4,047,103 | 9/1977 | Day et al. . |
| 4,244,219 | 1/1981 | Takahashi .......................... 73/313 X |
| 4,282,485 | 8/1981 | Pauwels et al. ..................... 324/208 |
| 4,297,698 | 10/1981 | Pauwels et al. .................. 324/208 X |
| 4,321,826 | 3/1982 | Bibbee et al. ..................... 73/313 X |
| 4,737,698 | 4/1988 | McMullin et al. . |

FOREIGN PATENT DOCUMENTS

| | | |
|---|---|---|
| 118327 | 2/1976 | Fed. Rep. of Germany . |
| 237279 | 2/1926 | United Kingdom . |
| 811417 | 4/1959 | United Kingdom . |
| 1426211 | 2/1976 | United Kingdom . |
| 1499417 | 2/1978 | United Kingdom . |
| 2000298A | 1/1979 | United Kingdom . |
| 2012431A | 7/1979 | United Kingdom . |
| 2027207A | 2/1980 | United Kingdom . |
| 2031157A | 4/1980 | United Kingdom . |
| 2160978A | 1/1986 | United Kingdom . |
| 2163259A | 2/1986 | United Kingdom . |
| 2167563A | 5/1986 | United Kingdom . |

Primary Examiner—Joseph J. Hail, III
Attorney, Agent, or Firm—Morgan & Finnegan

[57] ABSTRACT

A screened inductance level transducer has a drive winding for setting up a drive field, and a sense winding in which voltage is induced in the presence of the drive field. A conductive screen, which may be of stainless steel, is mounted on a float for movement in response to liquid level. In the presence of the screen, eddy currents are generated to establish a counter-field opposing the drive field and to thereby shade the sense winding to vary the voltage induced in it. The screen is contained within a tubular barrier which may also be of stainless steel, and the windings are located outside the barrier. In this way, the region within which liquid level is to be measured is isolated from the environment to the exterior of the unit, thus facilitating its use for recording liquid levels in hostile conditions.

3 Claims, 10 Drawing Sheets

LINEAL TURN DENSITY = ± K

LINEAL TURN DENSITY = K SIN $x$

ELECTRICAL DEGREES ($x$)

LINEAL TURN DENSITY = K $x$

ELECTRICAL DEGREES ($x$)

TRANSDUCERS FOR HOSTILE ENVIRONMENTS

BACKGROUND OF THE INVENTION

1. Field of the invention

This invention relates to improvements in or relating to transducers or sensors, in particular position sensors for use in hostile environments. Such sensors are required to provide signals indicative of the position of a moving member with which they are associated, relative to some fixed datum, and to function reliably even in difficult environmental conditions. In particular, the invention relates to sensors functioning as level transducers, for example, for indicating the level of liquid within a boiler system.

2. Description of the prior art

Devices measuring physical position and its direct derivatives, velocity and acceleration, together with the many devices measuring parameters as indirect functions of a physical displacement, form what is probably the largest single category of transducer systems. Commercially available electrical position transducers include: limit and micro-switches, proximity detectors operating on either capacitive or inductive principles; potentiometers, linear and rotary variable differential transformers, optical encoders, both incremental and absolute, synchros, resolvers and Inductosyns (Trademark). Each device has its associated advantages and disadvantages and its place in the market.

Briefly, limit and micro-switches detect discrete events and are used typically as end-stops in machinery. Potentiometers provide a continuous position indication and, in spite of the wear problems associated with the sliding contact, are still widely used in equipment design because of their low cost. Proximity detectors have the advantage of being non-contacting devices and also detect discrete events, although they have been developed to give continuous position monitoring. Variable differential transformers are non-contacting devices and are widely used for moderate precision measurements. Optical encoders are available from the crudest miniature models through to devices measuring seconds of arc. Synchros and resolvers are used in moderate to high precision measurements. The Inductosyn (Trademark) gives resolver-like signals and is used principally for very high precision linear and rotary measurements.

The present invention is directed to screened inductance sensors. The basic principle of operation of such sensors allows them to be used in all but the crudest of the commercial applications described above, and also facilitates their development as high precision measurement systems. The output signal produced by these devices is a continuously variable amplitude modulated carrier frequency, which puts it in a general class with proximity detectors, variable differential transformers, resolvers and Inductosyns (Trademark).

Important areas of application for screened inductance sensors are those where continuous position measurements are required. As such, they are distinguished from inductive proximity detectors and variable differential transformers by the very high accuracy achievable, and their design flexibility. They are distinguished from resolvers and Inductosyns (Trademark) by simplicity, in particular their passive moving member. They may be distinguished from all other sensing devices by particularly favourable manufacturing costs.

BRIEF SUMMARY OF THE INVENTION

It is an object of the invention to provide a screened inductance sensor capable of continuous and reliable operation in a hostile environment. It is a further object of the invention to provide a screened inductance sensor in which the electrical windings of the sensor are protected from a hostile environment, while yet being responsive to movement of a sensor member located within said hostile environment.

According to the invention, there is provided a sensor comprising a drive or exciting winding for establishing a forward or drive field, at least one secondary or sense winding in which a voltage may be induced in the presence of a said forward or drive field, and at least one conductive screen within which eddy currents are generated in the presence of a said forward or drive field to establish a counter-field opposing said forward field, said screen and secondary winding being displaceable relative to one another within said drive field so that said secondary winding may be shaded by said screen to a varying extent to thereby vary the voltage induced in said secondary winding, wherein barrier means are interposed between said windings and said screen, so that said screen may be disposed within a region environmentally isolatable from the region in which said windings are located.

Said barrier means may be defined by a wall portion and may be formed from stainless steel. The frequency of an energising input to be applied to the drive winding is selected in dependence of the thickness of the wall for the drive field to penetrate said barrier means or wall for the shading of said secondary winding by said screen. The screen may also be at least in part of a relatively poorly conductive material, such as stainless steel.

In a further aspect, the present invention provides a sensor comprising a drive or exciting winding for establishing a forward or drive field, at least one secondary or sense winding in which a voltage may be induced in the presence of a said forward or drive field, and at least one conductive screen within which eddy currents are generated in the presence of a said forward or drive field to establish a counter-field opposing said forward field, said screen and secondary winding being displaceable relative to one another within said drive field so that said secondary winding may be shaded by said screen to a varying extent to thereby vary the voltage induced in said secondary winding, wherein said screen is at least in part of a relatively poorly conductive material, such as stainless steel.

The barrier means and the screen may be of the same material, such as stainless steel, to contend with the environment in which the device is employed, in which case the screen has a thickness dimension substantially in excess of the thickness of the barrier means.

The use of relatively poorly conductive materials for both the screen and the barrier entails the establishment of an appropriate relativity between their respective thicknesses. That of the barrier means is generally determined by structural demands on the sensor and the frequency of the energising input to the drive winding is then selected to provide a skin depth sufficient for the passage of the drive field. By contrast, the thickness of the screening element is selected precisely to block the field and thus secure the required screening function. The skin depth determines the extent to which a magnetic field penetrates a material. As conductivity rises, so does field penetration decrease. The appropriate balance of material thicknesses may be selected by calculation from the various parameters of the sensor system and the characteristics of the materials used.

In an especially favoured construction, there is provided according to the invention, a level transducer comprising a sensor according to either of the foregoing aspects of the invention, wherein said screen has a substantially cylindrical outer peripheral region and said secondary or sense winding is disposed about the periphery of a notional cylinder substantially concentric with said peripheral region of the screen, and said screen and said secondary or sense winding are displaceable with respect to one another in an axial direction relative to the substantially common axis of said screen peripheral region and said notional cylinder, said barrier means being defined by a tube within which said screen is axially displaceable, and said drive and sense windings being disposed externally of said tube. Preferably the screen is at least in part of stainless steel and it may consist wholly of stainless steel. Alternatively the screen may be formed from copper or copper encased or sheathed in stainless steel. In a favoured construction, said drive winding is also disposed about the periphery of a further notional cylinder, again substantially concentric with the common axis of said peripheral region of the screen and said first-mentioned notional cylinder.

In yet another aspect, there is provided according to the invention a screened inductance sensor system comprising:
 (a) a drive winding,
 (b) means for energising the drive winding to set up an alternating magnetic drive field,
 (c) at least one sense winding to link the drive field,
 (d) a screening element for modulating the spatial distribution of the drive field, and
 (e) means for measuring variations in voltage induced in said sense winding to provide an indication of the relative positions of the screening element and said sense winding,
wherein said screening element is of a poorly conductive material or wherein barrier means are interposed between said windings and said screening element, so that said screening element may be disposed within a region environmentally isolatable from the region in which said windings are located. In either configuration, the drive winding may be arranged to establish a substantially even distribution of drive field over the area of said sense winding, at least in a direction of relative displacement of said screening element and said sense winding in a linear construction of sensor in accordance with the invention.

The selection of an arrangement in which the drive field has a substantially even or uniform distribution over the area of the sense windings facilitates predictable design of transducers according to the invention, as subsequently enlarged upon hereinafter.

The various favoured embodiments of the invention are especially suited to liquid level detection in closed vessels or systems such as for example, boilers. The screen is displaceably associated with a float, such as by means of an elongate rod, and the interior of the tube is arranged to communicate with the interior of the boiler but is sealed against the external environment. All electrical connections to and from the windings are thus located externally of the sealed boiler interior environment, hence there is no need for seals for the moving parts or for the coils to be located in possibly difficult or extreme operating conditions. Other applications include, inter alia, chemical process plants, petroleum refineries, stills and the like.

BRIEF DESCRIPTION OF THE DRAWINGS

The invention will now be described having regard to the accompanying drawings, in which.

DETAILED DESCRIPTION OF THE DRAWINGS

Figure 1:
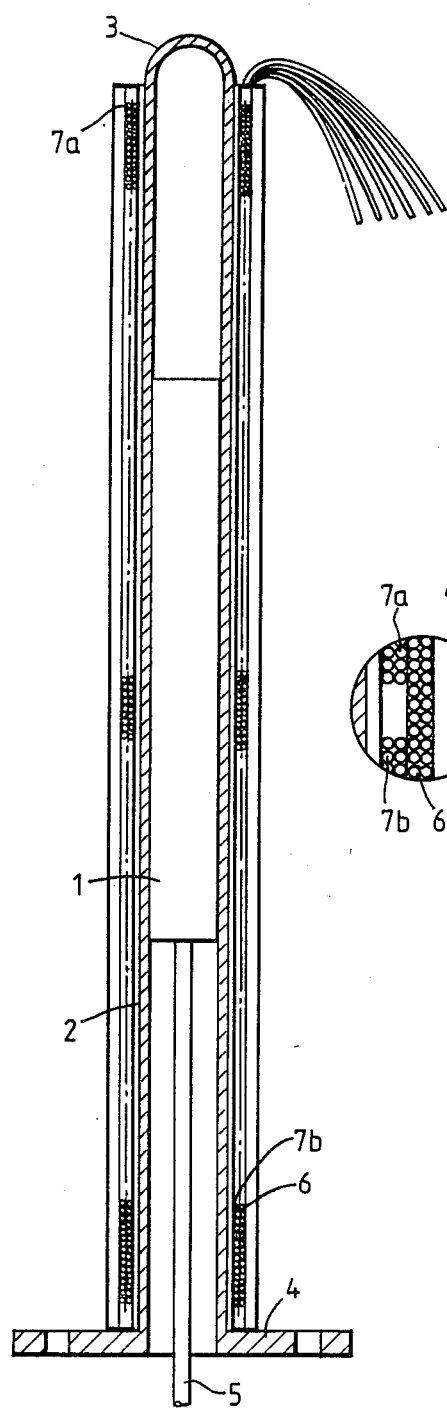
FIG. 1A is a cross-section on an axial plane of an environmentally sealed liquid level sensor in accordance with the invention.
FIG. 1B is an enlargement showing detail of the windings and barrier of the sensor of FIG. 1A at a location intermediate its axial ends.

FIGS. 1A and 1B shows a practical transducer for use as a control device in a boiler feedwater system.

High steam pressures, temperatures of several hundred degrees Centigrade, and the presence of highly corrosive gases in the mixture combine to make the application a difficult measurement problem. The device developed is remarkably simple, given these circumstances.

As shown in the Figures, a stainless steel plunger 1 is axially displaceable within a stainless steel tube 2, which is closed at its upper axial end 3 and has a flange 4 at its other end for mounting the unit on a boiler wall portion or over an opening in the feedwater system. The internal diameter of the tube may be, for example, 18.2 mm, while the external diameter of the plunger may be 17.8 mm. The clearance between the plunger and the tube should be sufficient to permit steam condensing within the sensor unit to flow back downwards into the feedwater system, and the dimensions cited are exemplary only. The plunger may be for example 140 mm long. It is connected by a rod 5 to a liquid level float, not shown, within the feedwater system, these further components being also of non-corrosive material. The range of measurement may be increased by the use of a spring to restrain the travel of the float against its buoyancy in the fluid.

Externally of the stainless tube, the sensor unit according to the invention has a drive winding 6 and a sense winding 7a, 7b. Coils 7a, 7b of the sense winding are wound in phase/anti-phase. The drive and sense windings are contained in an outer spool which slips over the tube and is totally isolated from the inner environment. Both windings are thus substantially cylindrical and surround the external periphery of the stainless steel tube 2. Drive winding 6 is located radially outwardly of sense winding 7a, 7b, but overlies it fully in the axial direction. The overall length of the sensor unit may be, for example, 330 mm.

In a suitable configuration, the drive winding may have two layers and 166 turns. It may be formed, for example, from 1.65 mm diameter wire. Within its overall length, the sense winding has two opposing coils, each of which extends over approximately one-half of the overall length of the unit, the coils each having, for example, 920 turns. The coils may typically be formed from 0.25 mm diameter wire, contra-wound.

The stainless steel plunger 1 forms the screen in the sensor unit according to the invention, and, when the drive winding 6 is suitably excited, the field established substantially penetrates the wall of the stainless steel tube 2. The voltage induced in the secondary winding 7a, 7b will, however, be affected by the shading effect created by the screen 1, so that the output voltage from the secondary winding 7a, 7b will be determined by the axial position of the screen 1. Accordingly an output signal indicative of liquid level within the boiler may be derived.

Ancillary apparatus for association with the sensor includes means for applying an alternating voltage to the drive winding 6 and means for demodulating the voltage output of the secondary or sense winding 7a, 7b to provide a signal indicative of the relative disposition of the screen and the secondary winding.

The stainless steel tube 2 provides a barrier means between the windings 6, 7a, 7b and the screen 1, such that the screen 1 may be located within a region physically sealed from that within which the coils are located. The use of stainless steel for the screen 1 and the tube or barrier 2 eliminates any problems of corrosion. The drive frequency applied to winding 6 is selected in relation to the physical dimensions of the tube 2, in particular its thickness, so that the ratio of flux for screened/unscreened conditions may be maximised. This selection of drive frequency in association with wall thickness may be analysed using magnetic field diffusion techniques. The essential criterion to provide the desired performance from the unit is that the field should substantially penetrate the barrier cylinder 2.

In order to enhance the screening effect, it is desirable for the moving plunger or screen 1 to be as conductive as possible. Therefore it would be expected that copper or aluminium should be preferred materials. However, it has, surprisingly, been found that a solid plunger of stainless steel is adequate to provide the necessary screening effect, and either of the common stainless steel grades, namely 18-8 or 25-12, may be used. However the use of a copper or aluminium plunger, optionally encased in stainless steel, is not excluded.

The mechanical construction of a unit according to the invention may make use of a vitreous enamel insulating layer on the outer surface of the stainless steel tube. Furthermore, the entire unit, including the outer periphery of the stainless steel tube and the sense and drive windings may be fully encased or impregnated using an enamel of lower melting point, to provide a substantially indestructible unit.

A remarkable feature in this transducer is the use of the same material for almost contradictory purposes. The stainless steel tube must allow the drive field to penetrate through its wall, while the stainless steel plunger must block the field. This is achieved by careful selection of drive frequency (w) and the material thickness, relative to the skin depth of field penetration, which is defined by $$D = \sqrt{2/wUR}$$

where D is the skin depth of field penetration, U is the material permeability, and R the material conductivity. With careful design, materials can be made substantially transparent or opaque to the drive field, as required.

Enlarging somewhat on this point, the barrier is preferably as thin as possible but the designer's freedom in this respect is limited by the need for structural integrity. The barrier must be capable of withstanding the physical demands placed upon it, which may include both high temperatures and high pressures, depending upon the application. The drive field must penetrate the barrier, however, and, given a particular barrier thickness determined by structural limitations, this may be achieved by selection of an appropriate drive frequency. While the field inside the barrier will be weaker than that outside, the substantial blocking of flux by the screen, which is necessary for the shading of the sense winding and is a feature of the invention, requires in general that the thickness of the plunger or inner screening element should be substantially in excess of that of the barrier, in particular, where the barrier and screen are of the same material.

The drive and demodulation circuit operation may be either continuous or intermittent. For continuous mode operation, a very long filter time constant is appropriate. In the intermittent mode, the drive circuit is pulsed, at fairly high power, at intervals of, for example, one second. Simultaneously, the sense voltages are switched to an integrater for an appropriate time period. The employment of dual-slope integration in a digital conversion strategy enables a ratiometric output, independent of the magnitude of the drive wave, to be obtained, with the possibility of incorporating self-correction for temperature effects.

Where used, tank circuits on the drive winding are characterized by a very low Q, because of the damping effect of the stainless steel barrier or container on the drive field. An oscillator and amplifier may be used rather than a self-resonant system, while a high level of drive power is also needed.

Errors may be introduced due to temperature effects manifesting themselves in relation to resistivity changes. A variety of methods may be employed to compensate for any such temperature effects. Such arrangements may include:

(a) incorporating temperature in a lock-up table.
(b) calibrating the device at the process temperature of greatest interest.
(c) setting up the transducer for zero sense voltage at that fluid level where accuracy is most critical, for example, at the target fluid level, in the case of a boiler.
(d) adapting the control system so that the drive current will increase with temperature. This may be achieved, for example, by the use of temperature sensitive resistors in series with the drive windings or by partial shunting of the sense windings.

Figure 2:
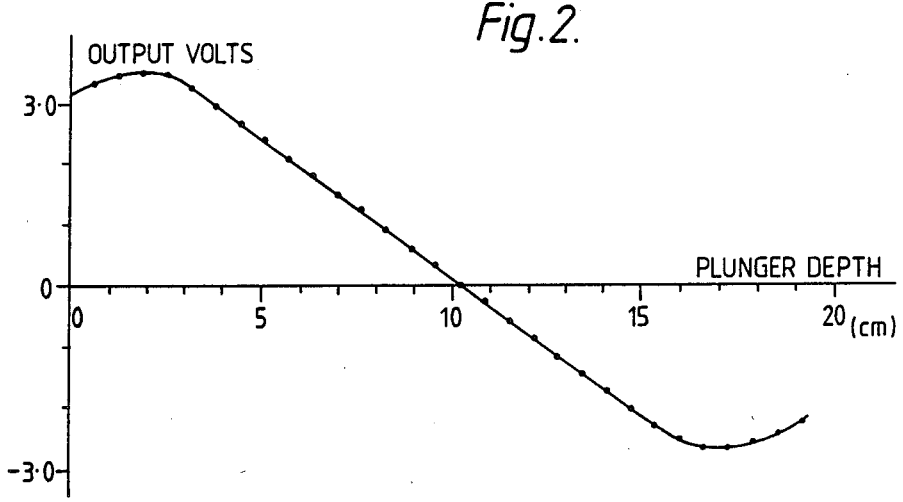
FIG. 2 shows the demodulated output signal obtained from the sensor of FIG. 1.

FIG. 2 shows the demodulated output for the transducer of FIG. 1, as a function of plunger depth. The transducer configuration is for piecewise linear modulation, as subsequently explained, and the output is seen to be remarkably linear over its central working portion. An element of offset will also be apparent in this practical record of sensor output. Such offset can readily be removed, either by constructional or signal processing techniques.

Other practical aspects of the construction of the sensor of the invention are that the solid plunger 1 of FIG. 1 may be replaced by a thick-walled tube and that the axial length of the device may be extended to a value limited only by external physical constraints. Electrically, increased length enhances the linearity of the response of the sensor.

This foregoing embodiment illustrates the flexibility of the screened inductance sensor. The simplicity of the materials used makes for considerable ease of implementation, relative to most conventional devices.

In order to better appreciate the principles underlying the invention, and in particular, the nature of the demodulated output signal as shown in FIG. 2, the fundamental features of screened inductance sensors may now be described, in regard to FIGS. 3 to 8.

Figure 3:
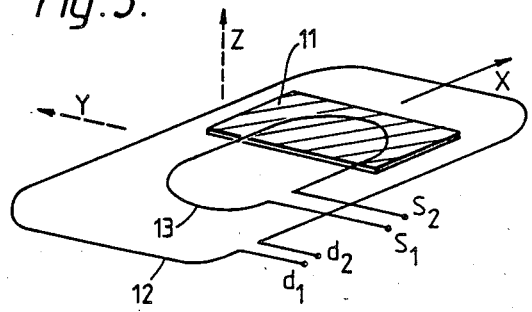
FIG. 3 is a schematic pictorial view of a basic planar configuration of screened inductance sensor illustrative of the basic principles of the invention.

The basic elements of a screened inductance sensor system are at least two normally stationary coils, and a passive, conductive screen whose position controls the mutual coupling between the coils. An elementary linear planar geometry of transducer is illustrated in FIG. 3, showing a screen 11, a drive or primary winding 12, which in operation is excited by an oscillator, and a sense, or measurement or secondary, winding 13. While it is desirable that the screen 11 be physically interposed between the windings, this is not a necessary condition for operation. As the screen 11 moves, it shades the sense winding 13 from the drive field to a varying extent and hence controls the voltage induced in this winding. The basic transducer can be realized in a variety of geometries, as will be illustrated in certain of the following Figures, but the planar version is perhaps the most readily visualized, and subsequent discussion will be set out in relation to it. However, FIG. 4 shows a linear solenoidal device, by way of example of a geometric variation, having a cylindrical screen 21, a solenoidal drive winding 22 with terminals d1 and d2, and a solenoidal sense winding 23 with terminals S1 and S2.

Figure 4:
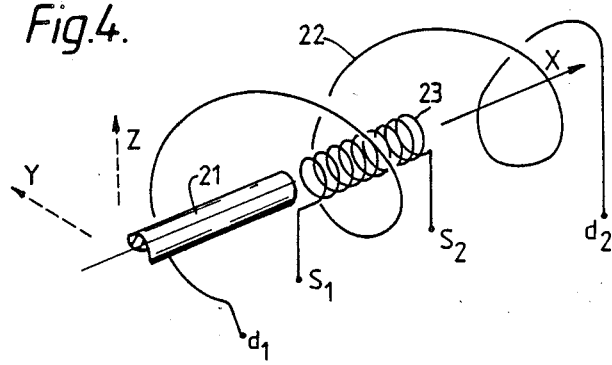
FIG. 4 is a schematic pictorial view of a solenoidal realisation of the basic sensor of FIG. 3.

Both FIGS. 3 and 4 are schematic only and do not necessarily represent practical geometries. However, all practical constructions and their mode of operation can be traced back to the primitives of FIG. 3. The distinction between the planar and solenoidal type windings is also practical rather than fundamental, but it is helpful for visualizing geometric variations.

Rotational variants, certain practical examples of which are also illustrated subsequently, may be readily visualised from the schematic arrangement of FIG. 3. In a rotational planar configuration, the screen is defined by a portion of a disc, while the sense coils are laid out in a circular path on a notional plane perpendicular to the axis of rotation. The drive winding may also be similarly disposed, or alternatively, in a rotational planar screened inductance sensor, the field may be established by a solenoidal coil, as will be illustrated subsequently.

In a cylindrical rotary embodiment, the planar configuration of FIG. 1 may be envisaged as being wrapped around on a cylindrical path, so that the screens are defined by portions of a cylindrical surface, while the sense coils also occupy a series of locations around a notional cylindrical surface. As in the case of the rotary planar arrangement, the drive coil may in such a configuration also take up a solenoidal shape.

In operation, the simple planar geometry of FIG. 3 provides a modulated output signal which yields a modulation envelope after synchronous demodulation of the output. The drive and sense windings are assumed to be each composed of a single turn. The drive coil is excited by a sinusoidal current, setting up a magnetic field $$B = \hat{B} \sin wt$$

which is assumed to be evenly distributed over the area of the sense coil. $\hat{B}$ is the peak value of the field and B is thus the time-varying flux within the area of the drive coil. The voltage induced in the sense coil (VS) will therefore be $$V_s = w\hat{B}A \cos wt$$

where A is the unscreened area of the sense coil (assuming 100% efficiency of screening). After synchronous demodulation, the average value of sense voltage obtained will be $$V_s = \frac{2}{pi} w\hat{B}A \qquad (1)$$
$$= kA$$

For constant excitation, differentiation gives $$\frac{dV_s}{dx} = k\frac{dA}{dx} \qquad (2)$$

Equation (1) stated in words says that the output voltage is proportional to the unscreened area of the sense coil. Equation (2) stated in words says that the slope, or shape, of the modulation envelope at any point is determined by the rate at which sense winding area is being uncovered at that point. Either of these statements forms a basis for the design of a screened inductance transducer. The rate at which winding area is covered is clearly a simple function of the geometries of the sense winding and the screen. By appropriate shaping, any modulation envelope can be realised. The output of the transducer shown in FIG. 3 is always greater than zero. It effectively contains an offset term, whose magnitude depends on the strength of the drive field, and this may complicate the signal processing scheme in certain cases.

Figure 5A:
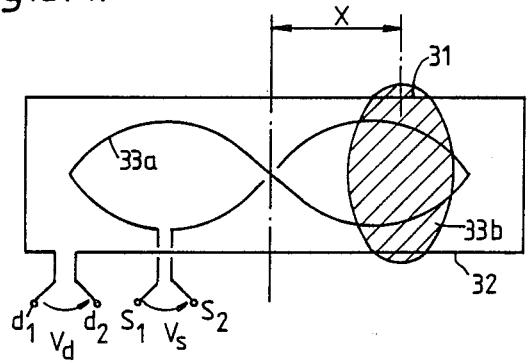
FIG. 5A shows a phase/anti-phase coil arrangement for the sense winding of a sensor in accordance with the basic configuration of FIG. 3.

A winding technique used in many practical devices including the level transducer of FIG. 1 is shown in FIG. 5A. The sense winding 33 here is composed of two (or more) coils 33a, 33b wound in phase/anti-phase and connected in series. This results in a null output for the sense winding in the absence of the screen 31, or when the screen is centrally located. Output signals which are symmetrical about zero facilitate signal processing.

The offset previously mentioned can then be eliminated very simply by the arrangement shown in FIG. 5A. In the situations where no screen is present, or where the screen shades both coils equally, there will be no net output voltage. The modulation envelope now becomes symmetrical about zero. A further, very significant, advantage of this arrangement is that excellent immunity from stray noise fields can be achieved. Equal and opposite voltages will tend to be induced in the phase/anti-phase coils and will thus cancel. Double coil windings such as this are used in most practical transducers. In this case equation (1) becomes $$V_s = k(A1 - A2) \quad (3)$$

where A1 is the unscreened area of coil 1 (33a) and A2 is the unscreened area of coil 2 (33b). Equation (2) becomes $$\frac{dV_s}{dx} = k\left(\frac{dA1}{dx} - \frac{da2}{dx}\right) \quad (4)$$

Output voltage is thus now determined by the net unscreened area of sense coils. In FIG. 5A, Vd is the drive winding (32) input voltage at its terminals d1, d2.

Figure 5B:
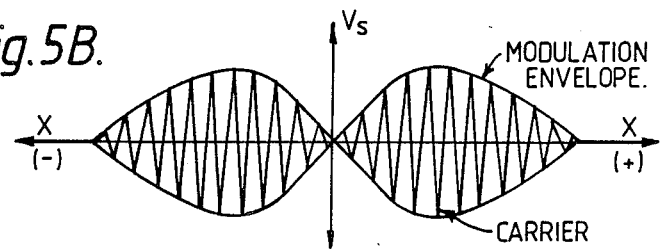
FIG. 5B shows the transducer output from the sense winding of the unit of FIG. 5A.
Figure 5C:
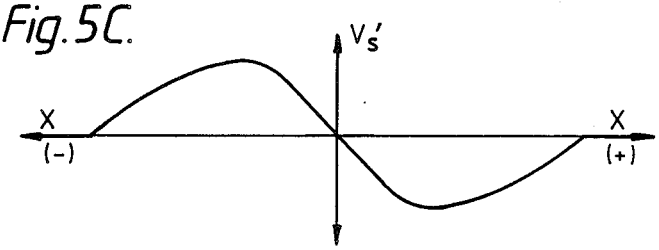
FIG. 5C shows the demodulated sense winding output from the transducer of FIG. 5A.

FIG. 5B shows the transducer output from the arrangement of FIG. 5A in terms of the modulation envelope, while FIG. 5C shows the final demodulated output.

Figure 5D:
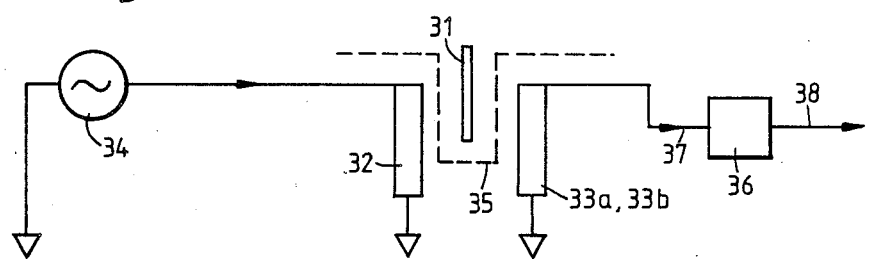
FIG. 5D is a schematic diagram of a sensor system to include a sensor in accordance with the invention.

FIG. 5D shows a schematic diagram of a sensor system to include a sensor in accordance with the invention. An oscillator 34 provides an input to the drive winding 32 to create the drive field. The environmental barrier 35 is located between the drive winding 32 and the movable screening plate 31, and also between the screen 31 and the coil or coils of the sense winding 33a, 33b. The output voltage from the sense winding is processed in a demodulator and signal conditioning unit denoted by reference 36 to provide the final output signal 38 from the device. The system of FIG. 5D facilitates the derivation of the outputs shown in FIG. 5B and FIG. 5C, the initial transducer output of FIG. 5B being present at stage 37 of the system of FIG. 5D, and the demodulated output of FIG. 5C forming the final output 38 from the system.

It is possible, by choice of screen and winding shape, to design transducers with any arbitrary transfer function relating the modulation envelope to screen position. However, experience has shown that three such modulation envelopes are of particular practical significance. These are:

(a) Piecewise linear modulation (type 'W')
(b) Sinusoidal modulation (type 'D')
(c) Elongated working stroke (type 'E')

Figure 6A:
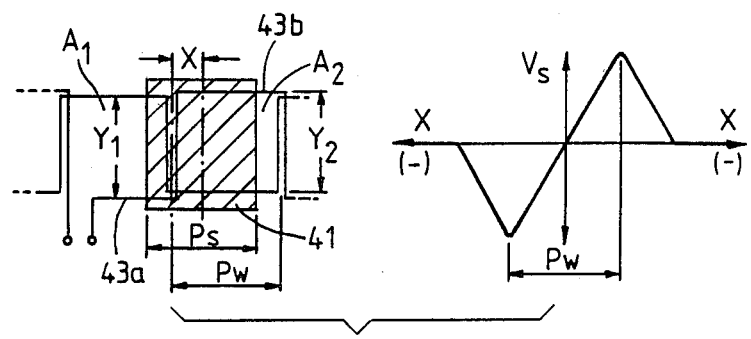
FIG. 6A shows a planar screened inductance sensor adapted for piecewise linear modulation.
Figure 6B:
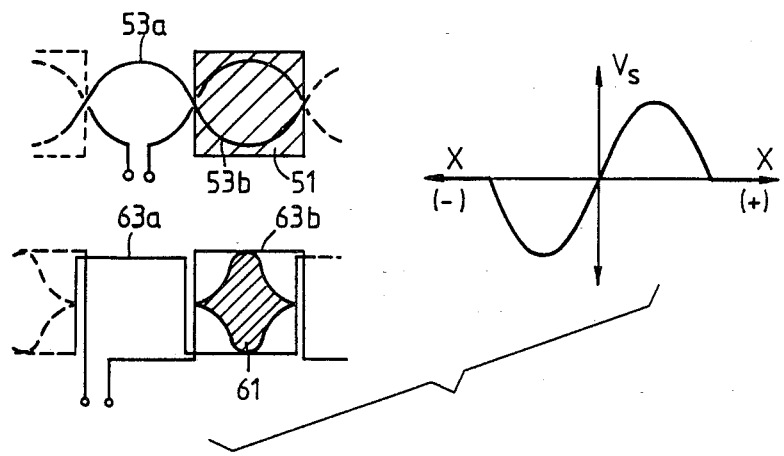
FIG. 6B shows adaptations of a planar sensor providing sinusoidal modulation.
Figure 6C:
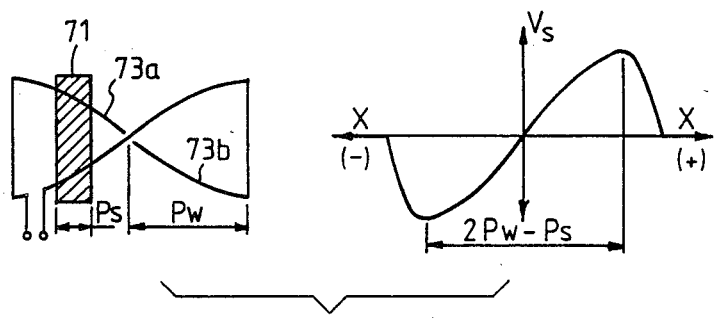
FIG. 6C shows a planar elongated working stroke adaptation of sensor.

These are now explained in more detail for the planar case, with reference to FIGS. 6A, 6B and 6C. Piecewise linear (FIG. 6A) modulation is achieved by using rectangular screens in conjunction with a rectangular pattern of sense winding 43a, 43b. Drive winding means to create an even field distribution over the area of the sense winding 43a, 43b is assumed. The screen pitch, Ps, is substantially the same as the winding pitch, Pw. These conditions ensure that sense winding area is uncovered at a constant rate with screen position, the rate abruptly reversing after the screen has reached the point of fully covering the sense coil. The advantages of this modulation pattern are:

(i) It can typically be realized with a simple transducer design.
(ii) Position being locally proportional to the magnitude of the waveform greatly facilitates low cost signal processing.

Mathematically, for the arrangement of FIG. 6A, $$A1 - A2 = y1\left[Pw - \left(\frac{Ps}{2} + x\right)\right] - y2\left[Pw - \left(\frac{Pw}{2} - x\right)\right] \quad (5)$$

where Pw is the winding pitch, Ps is the screen pitch and y1, y2 are the screen/winding overlaps. x is the displacement of the mid-point of the screen from a fixed datum as illustrated in FIG. 6A. This datum is defined by the cross-over point of the sense winding. When the screen is central on the sense winding, there is a null output, as shown in the diagram of signal output also shown in FIG. 6A. If the following simplifying assumptions are made:

$$y1 = y2 = y \text{ and } Pw = Ps = P$$

equation (5) reduces to $$A1 - A2 = 2yx \quad (6)$$

and equations (3) and (4) become $$V_s = k'yx, \text{ and} \quad (7)$$

$$V_s = k'yx, \text{ and} \quad (7)$$

$$\frac{dV_s}{dx} = k'y \quad (8)$$

This confirms that the output is linear and proportional to displacement, or that the slope of the output curve is a constant. Differentiating equation (7) with respect to time gives $$\frac{dV_s}{dt} = k'y\frac{dx}{dt} = k'yV \quad (9)$$

where V is the velocity of motion of the screen. This shows that a speed signal can be derived from this transducer by simple differentiation of the output.

The analysis of type W transducers is relatively simple: the more general case involves manipulation of equation (5) where y1 and y2 are not equal and are functions of x, but the basic procedures followed are the same.

In practice, a certain amount of rounding of the peaks of the output waveform is inevitable, as indicated in FIG. 6A. However, good linearity is achievable over a substantial portion of the ramp waveform, with proper design.

As illustrated in FIG. 6B, the modulation envelope is designed to be a sinusoidal function of screen position. The advantage of this is that there are a wide selection of commercially available converters which will derive a digital position signal from amplitude modulated sine/cosine information. As shown schematically in FIG. 6B, the derived modulation envelope can be achieved with rectangular screens 51 and shaped windings 53a/b, or by shaped screens 61 and rectangular windings 63a, 63b, or indeed by a shaping of both elements. Generally speaking it is favourable to choose designs where screen area predominates over winding area, and therefore practical designs will tend to take the form of the rectangular screen and shaped coil.

The end result in any case should be to ensure that the nett flux linkage of the sense winding varies in a sinusoidal manner with screen position.

Both type "W" and type "D" systems are particularly suitable for situations where the basic transducer element forms part of a multipole system, or where it closes on itself, as in rotary designs. However, for simple limited motion transducers using only the central monotonic section of the output signal, either of these designs suffer from a disadvantage: a full winding pitch, 2Pw, and hence the length of the transducer, is twice the length of the central active portion of the output waveform. This disadvantage is overcome in type "E" transducers where a short pitched screen 71 and shaped sense windings 73a, 73b are used, giving an active region of length 2Pw — Ps as shown in FIG. 6C.

The screen pitch, Ps, is made significantly less than the winding pitch, Pw. The modulation envelope is normally determined by the shape of the sense winding, which characteristically will have a tapered form, as shown in FIG. 6C. While screening efficiency and hence achievable accuracy tends to be reduced in this configuration this is not necessarily disadvantageous in elongated working stroke designs.

Figure 7A:
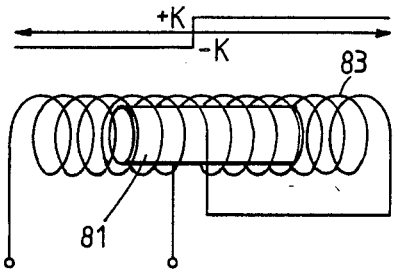
FIG. 7A, 7B and 7C show solenoidal screened inductance sensor constructions corresponding in principle of operation to the planar arrangements of FIGS. 6A, 6B and 6C.
Figure 7B:
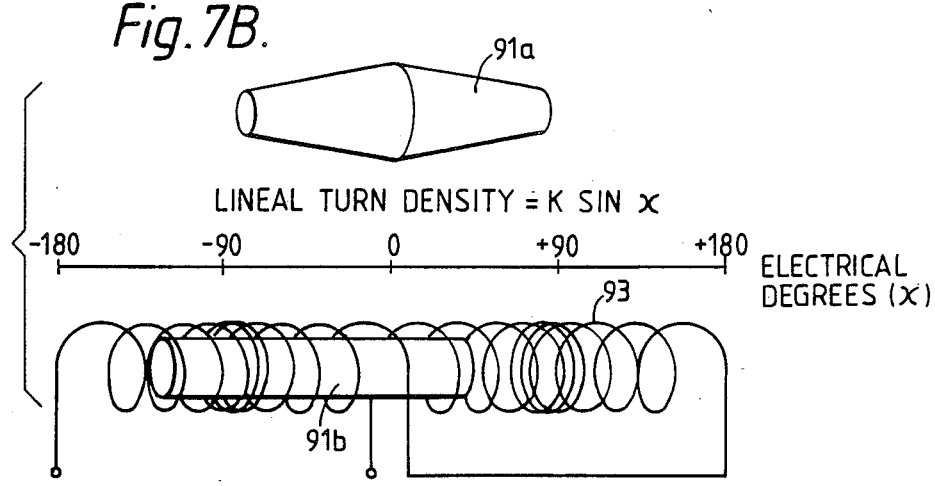
Figure 7C:
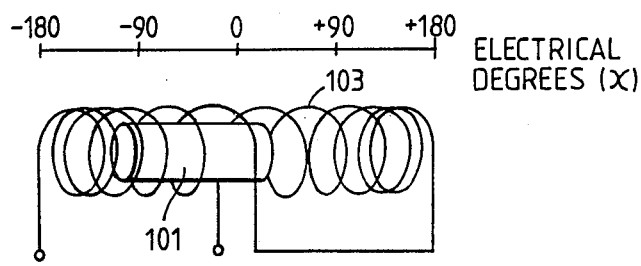

The screen/winding combinations shown in planar form in FIGS. 6A, 6B and 6C all have equivalents in solenoidal geometries, as shown in FIGS. 7A, 7B and 7C. The arrangement of FIG. 7A provides piecewise linear modulation, with a cylindrical screen 81, constant axial turn density in the sense winding 83, and phase reversal centrally along its axial extent.

Sinusoidal modulation, FIG. 7B, may be achieved by a shaped double-tapered screen 91a co-operating with a constant density sense winding, such as coil 83 of FIG. 6A, or alternatively, a cylindrical screen 91b of constant cross-section may be employed, in conjunction with a sense winding 93 in which the lineal turn density is sinusoidal.

The solenoidal form shown in FIG. 7C is illustrative of the elongated working stroke case with cylindrical screen 101 and sense winding 103.

Analysis of solenoidal type windings is in some respects simpler than planar types, and in some respects more complicated. It is simplified in that the field inside a long uniform solenoidal drive winding 112, as shown in FIG. 7D, is readily calculated from Ampere's circuital law, and in region 1 has the magnitude $$H = ndI \sin Wt \tag{10}$$

$$B = U_o\, ndI \sin Wt \tag{11}$$

where nd is the drive winding turn density, expressed in conductors per meter, and I Sin Wt is the exciting current. B represents flux density and H is field strength. Apart from small regions near the ends, the field will be uniform over the interior volume, will be axial in direction, and will be negligible outside the coil 112.

Figure 7D:
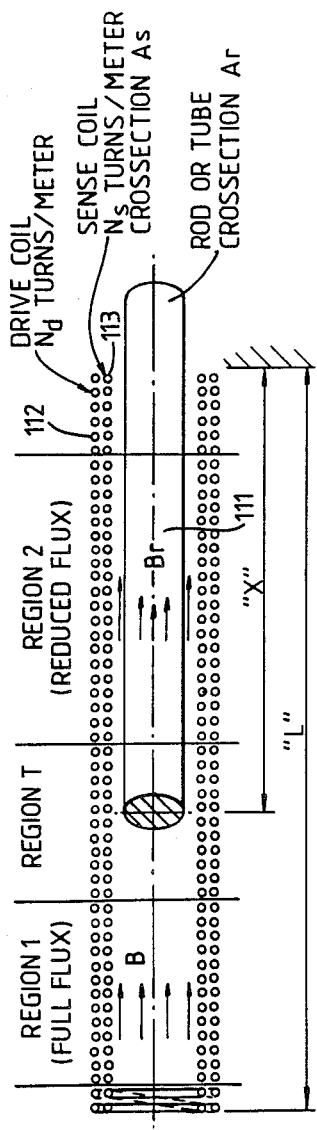
FIG. 7D is a more detailed pictorial representation of a particular linear solenoidal arrangement.

FIG. 7D also shows a rod or tube 111 of conductive non-ferromagnetic material partially inserted into the solenoid. Away from end effects, in region 2, the field will from symmetry be axial. The induced current density J in the rod 111 will be circumferential. Currents in the rod 111 act to reduce the field within it. In the space between the rod and the winding 112, the field will be unaffected by the presence of the rod. It will have the same value as in region 1. Between regions 1 and 2, however, there is an area of transition in which the field will have a complex structure not easily calculated. This is the complication mentioned previously. In effect, the flux per turn in regions 1 and 2 is uniform, but different, and a nett outflow or inflow across the surface of the solenoid is required in the transition region. The transition region can thus be defined as that portion of the axial length of the solenoid in which the flux per turn linked by the sense winding varies locally with position.

FIG. 7D shows a solenoidal sense winding or coil 113 with turn density ns and cross section As contained within the drive winding. In the most general case both ns and Ar, the rod cross-section, will be variable along their lengths. A useful simplifying assumption is to neglect penetration of the drive field within the rod. This will be true for high values of drive frequency or rod conductivity. The average voltage induced in the sense winding will then be given by $$Vs = \frac{2w}{pi} \int_{1=0}^{L} B(As - Ar)ns \cdot dl \tag{12}$$

where both Ar and ns are functions of length (1).

Equation (12) can be calculated in a straightforward way in regions 1 and 2. In practice the situation will normally be further simplified by choosing a rod of constant cross section, and varying only the turn density of the sense coil. This also makes possible an anlytic solution for the actual field within a non-ideal rod, which then becomes a classical problem for Bessel functions.

A final simplifying assumption allows the problem of analysing the transition region to be disposed of. If the sense windings are evenly distributed, or if their gradient of change is low relative to the width of the transition region, the effect of the transition region may be neglected. Consider an incremental penetration dx of the rod into the solenoid. Region 2 increases at the expense of region 1. The transition region T moves with the rod, without changing its configuration. Given that there has been no significant change in turn density over the increment of motion, the flux linkage contribution of the transition region does not change. Even if the flux linked by each individual turn within the region is not known, the same flux will be linked by the same number of turns, after the increment of motion. However, if a frame of reference is chosen which does not move with the rod, the change in total flux linkage of the sense winding can be clearly seen. Assuming negligible field penetration within the conductor, a miniature cylinder containing flux B.Ar and linking ns(x).dx turns, has been removed. This leads to the equation $$\frac{dV's}{dx} = -2 \frac{w}{pi} \hat{B} \cdot Ar \cdot n(x) \quad (13)$$

which is the equivalent, for solenoidal windings, of equation (2). Stated in words it says that the slope or shape of the modulation envelope at any point is proportional to the turn density at that point.

All of the above arguments continue to hold even when the rod and solenoid axes are relatively displaced. In practice, this allows for very relaxed mechanical tolerances in solenoidal type geometries.

All of the foregoing treatments assume an even and substantially total screening of drive field underneath the boundaries of the screen.

If the airgap between screen and sense winding is large relative to the screen dimensions, however, edge effects will become important and there will be a gradual diminishing effectiveness towards the boundaries of the screen. This can be exploited to advantage when a sinusoidal modulation envelope is derived in multipole linear and rotary devices. When the number of poles is large, space considerations will restrict the degree of shaping which can be applied to the poles and sense windings. However, even with a rectangular screen and rectangular sense windings, a substantially sinusoidal modulation will result due to the effectively graded airgap of the screen.

It is also advantageous if the drive field has a substantially even distribution over the area of the sense winding in the absence of the screen, at least on the axis of motion. For example, in the case of the linear planar device therefore, the drive field should have a constant value along any line in or parallel to this direction of relative screen and sense winding displacement, although it may vary at right angles to the direction of motion, so that the field density or any given such line is not necessarily the same as that along another and parallel line.

Figure 8:
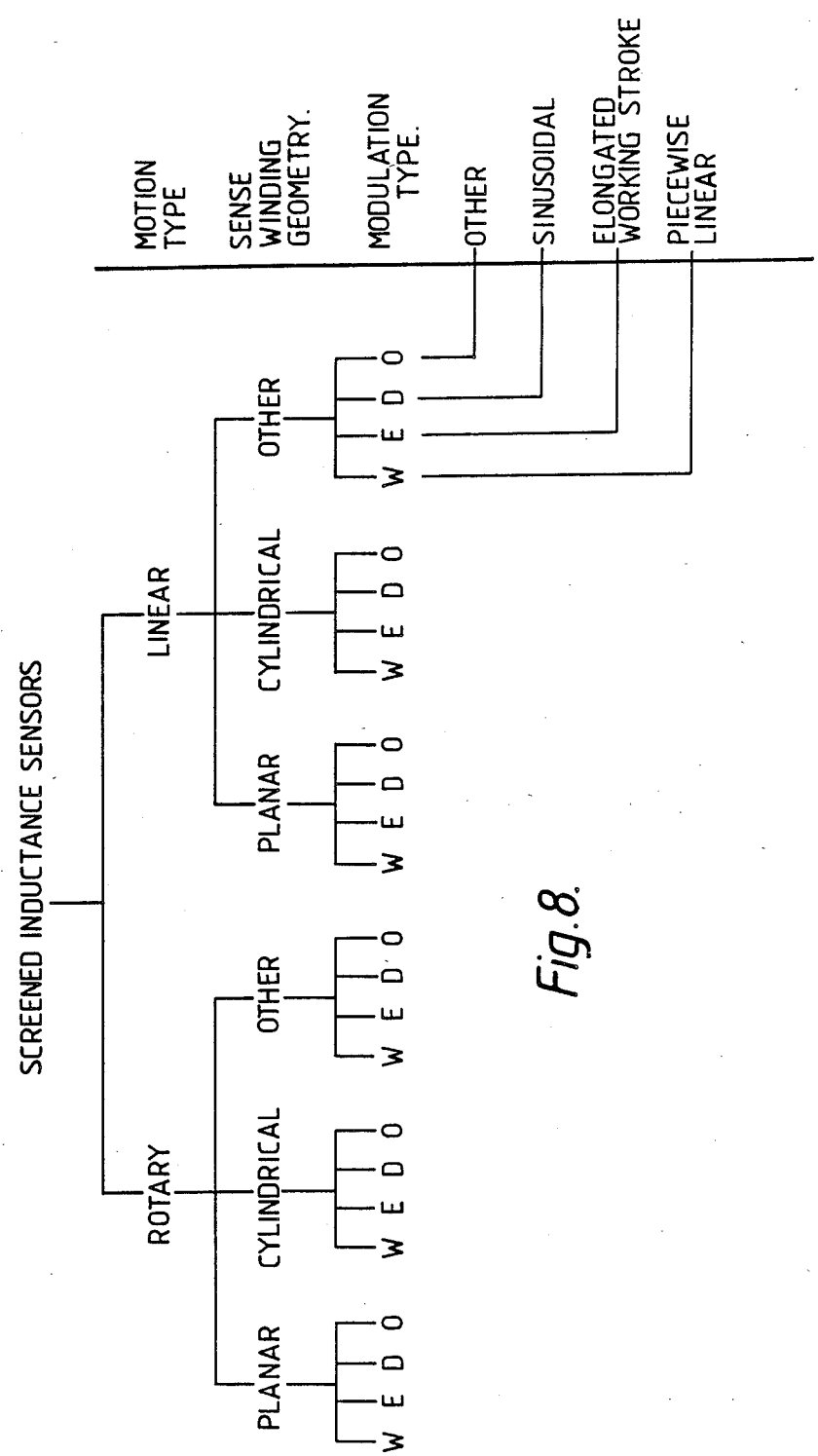
FIG. 8 is a chart setting out the various classes into which screened inductance sensors may be categorised.

Screened inductance transducers can be classified on many different parameters, but the following categorisation, illustrated in FIG. 8, has been found to give a clear description of the measurement system:
 (a) Measurement axis: Motion is either rotary or linear
 (b) Sense winding surface: The sense winding is laid on either a planar surface, a cylindrical surface, or some other surface.
 (c) Modulation envelope: piecewise linear (W), sinusoidal (D), elongated working stroke (E), or other (0).

These categorisations give rise to the hierachy of devices as set out in FIG. 8.

Figure 10:
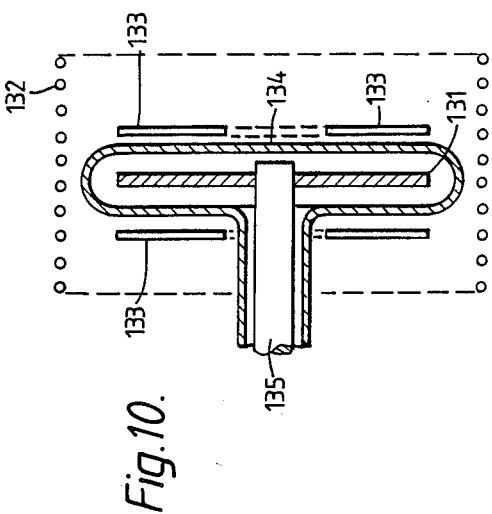
FIG. 10 is an axial cross-sectional view of a rotary planar construction of sensor in accordance with the invention.
Figure 9:
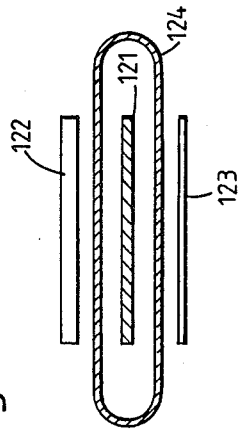
FIG. 9 shows, in a schematic sectional end view, a linear planar configuration of sensor according to the invention.
Figure 11:
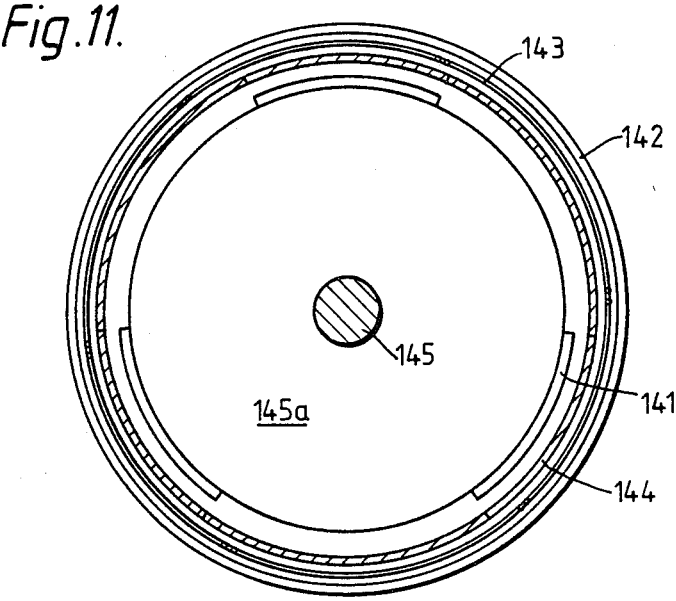
FIG. 11 is a sectional end view of a rotary cylindrical construction of screened inductance sensor.

Following on the foregoing generalised discussion of the operation of screened inductance sensors, FIGS. 9, 10 and 11 show, respectively, a linear planar configuration of screened inductance sensor, a rotary planar construction, and finally a rotary cylindrical embodiment, in each case incorporating a barrier corresponding to the stainless steel tube 2 of the embodiment of FIG. 1.

As shown in FIG. 9, in end sectional view, a screen 121 moves linearly through a space sealed off by a barrier 124 from an external environment in which drive winding 122 and sense winding 123 are disposed. Again there is total separation of the environment in which the screen 121 moves from that in which the sense and drive windings are located.

FIG. 10 shows a rotary planar configuration of sensor according to the invention, in which screens 131 are defined by either radially extending fins or by conductive portions on a radially disposed disc. The screens rotate with a shaft 135 which is located within an environment sealed off by barrier 134. The drive field is established by solenoidal coil 132, which creates a drive field extending substantially parallel to the axis of rotation of the screens. As in the case of the linear embodiments, the sense winding may be a single winding unit located to one side of the screen, but in the arrangement shown in the drawing, in order to provide a symmetrical construction, sense winding 133 is defined by portions located to each axial side of the barrier 134 within which screens 131 are located.

Finally, FIG. 11 illustrates a rotary cylindrical construction, in which the screens 141 are defined by arcuate segmental conductive portions disposed on the periphery of a cylinder 145a mounted for rotation on a shaft 145. This rotary assembly is enclosed within a tubular barrier 144, with the winding elements of the sensor disposed on a spool located around the exterior of the barrier, the winding assembly comprising drive winding 142 and sense windings 143.

The schematic representations of FIGS. 3 and 4 illustrate transducer configurations applicable to the present invention in which the sense winding has a single coil. FIG. 5A illustrates an arrangement in which the sense winding has dual coils, wound in phase/anti-phase, and this arrangement is used in many practical applications of the device of the invention.

Figure 12:
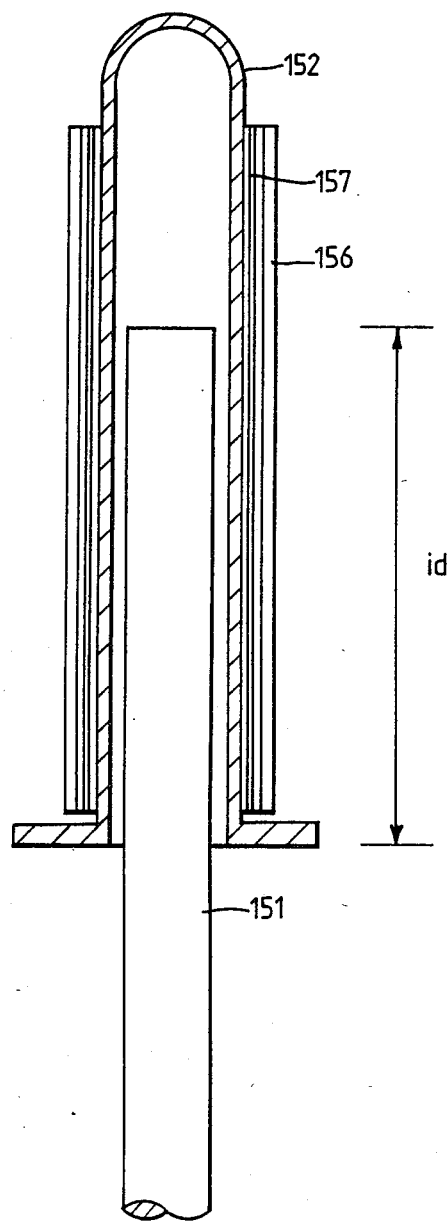
FIG. 12 is a cross-section on an axial plane of a long-stroke embodiment of environmentally sealed liquid level sensor in accordance with the invention.

FIG. 12 depicts a practical example of the single sense coil arrangement of FIGS. 3 and 4. A so-called long stroke version of a linear-cylindrical transducer is shown in this Figure, which corresponds in its general construction with the arrangement of FIG. 1. The plunger of FIG. 1 is replaced by a solid rod 151 movable inside tubular barrier 152, surrounded by drive 156 and sense 157 windings. Reference id indicates the extent of rod penetration. The phase/anti-phase sense windings of FIG. 1, also shown in FIG. 7A, are replaced by a single solenoidal sense coil 157 wound over the full extent of the transducer. Thus there is no reversal of winding direction along the length of the sense winding. In this case therefore the output signal magnitude is always greater than zero, and the transducer sensitivity is directly related to the drive voltage magnitude. However, movement of the rod 151 changes the net amount of screening metal contained within the drive coil, and may therefore result in changes in the drive oscillator signal magnitude and frequency. Such changes may be overcome by a form of ratiometric conversion. By combination of equations (11) and (13), it can be shown that $$\frac{dV's}{dx} = k \cdot w \cdot I \cdot ns(x)$$

Figure 13:
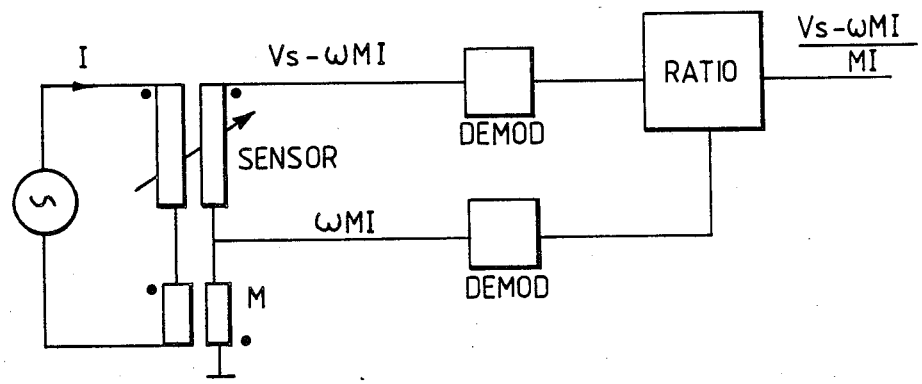
FIG. 13 is a schematic diagram of a sensor system to incorporate a unit in accordance with FIG. 12.

The quantity wI can be deduced by including a mutual inductor M in series with the drive and sense windings, as shown in the schematic system diagram of FIG. 13. The ratio $$\frac{Vs - wMI}{wMI}$$

can be easily calculated using electronic converters.

Figure 14A:
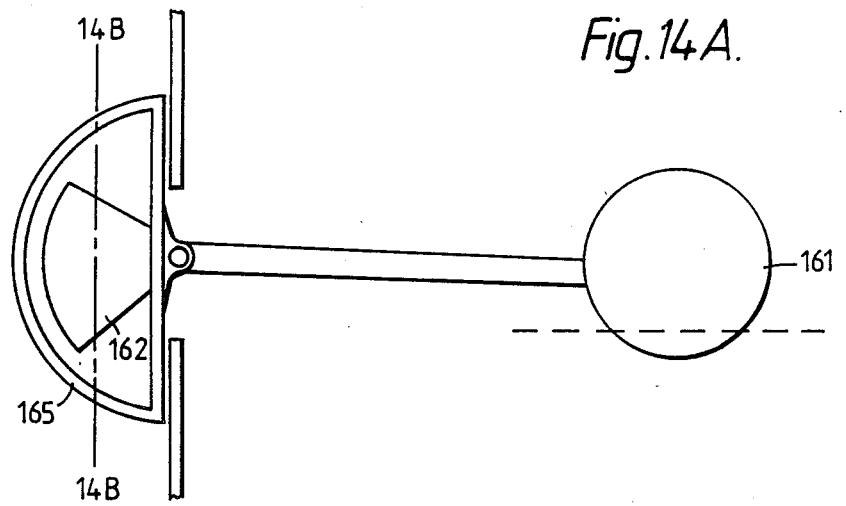
FIG. 14A is a sectional side view of a float-type limited motion sensor in accordance with the invention.
Figure 14B:
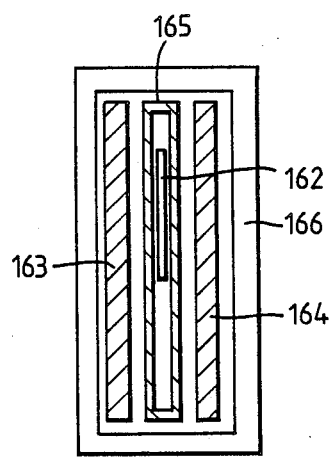
FIG. 14B is a sectional view of the sensor of FIG. 14A on the plane 14B—14B of FIG. 14A.
Figure 14C:
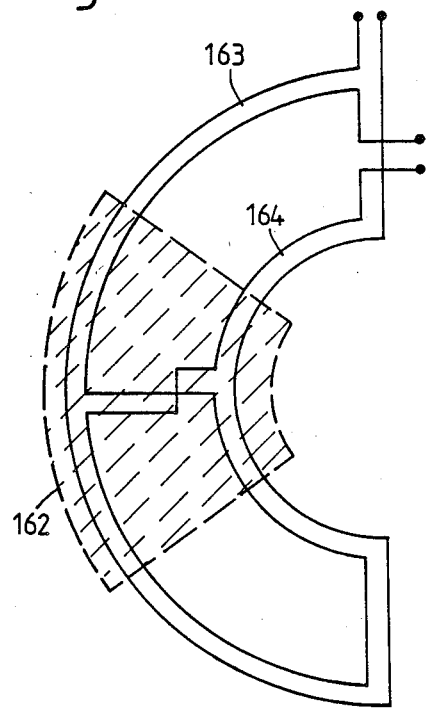
FIG. 14C is a schematic view of the winding and screen arrangements of the sensor of FIG. 14A.

In the general area of fluid level measurements, an alternative to the use of a plunger and connecting rod-type system, such as is illustrated in FIGS. 1 and 12, is to transform the motion of a float into limited angular rotation by means of a ballcock-type apparatus. An example of a transducer using such a system is shown in FIG. 14A. Float 161 is pivotably connected to screen 162, which is in the form of an arcuate segment and defines the screen of the device. Drive 163 and sense 164 windings are provided, as shown in section in FIG. 14B and schematically in FIG. 14C. The screen is enclosed within barrier 165. The entire unit may be surrounded by an optional ferromagnetic external flux return path or cover 166. The general device geometry is that of the rotary-planar type already described, but only a portion of the notional disc surface is used for the sense windings in this case. FIG. 14C illustrates possible sense winding geometries (for type W modulation). Alternatively, the configuration of the system in this elongated working/construction may be adapted to provide a transfer function complementary to that relating fluid level to the angle of the measurement arm, to provide an overall linear response for the system. The environmental barrier for the device as illustrated in FIG. 14A is in the general form of box, D-shaped in cross-section, which surrounds the screen and is bolted onto or welded to a wall of the tank within which level is to be measured. Rotary cylindrical geometries may also be provided for applications of this kind.

The primary advantage of a float-type system as compared with the plunger-type configurations previously described is that the transducer generally projects to a lesser extent to the exterior of the region within which level is to be measured, while the tubular float-type arrangement is especially favourable in withstanding high pressure differences, in that it provides advantageous stressing and structural features.

The foregoing exemplifications of the different classifications of sensor according to the invention are given by way of example only. It will be apparent from FIG. 8 that a multiplicity of further constructions, all incorporating the features of the invention, may be provided within the present disclosure.

We claim:

1. A sensor comprising windings, at least one screen, and barrier means, said windings including a drive or exciting winding for establishing a forward or drive field and at least one secondary or sense winding in which a voltage may be induced in the presence of said forward or drive field, said at least one screen being a conductive screen within which eddy currents are generated in the presence of said forward or drive field to establish a counter-field opposing said forward or drive field, and said barrier means being interposed between said windings and said at least one screen, so that said at least one screen may be disposed within a region environmentally isolatable from the region in which said windings are located, said at least one screen and said at least one secondary or sense winding being displaceable relative to one another within said forward or drive field so that said at least one secondary or sense winding may be shaded by said at least one screen to a varying extent to thereby vary the voltage induced in said at least one secondary or sense winding, the relative displacement of said at least one screen and said at least one secondary or sense winding being limited to substantially a single direction of displacement, said drive or exciting winding being configured so that in the absence of said at least one screen said forward or drive field is substantially even over said at least one secondary or sense winding in said single direction of relative displacement of said at least one screen and said at least one secondary or sense winding, said at least one secondary or sense winding being a two-terminal winding, said at least one screen having a surface region which is substantially parallel to a notional surface defined by said at least one secondary or sense winding, said barrier means being of a relatively poorly conductive material, said at least one screen comprising the same relatively poorly conductive material as the poorly conductive material of said barrier means, said relatively poorly conductive material being stainless steel, and said at least one screen having a thickness dimension substantially in excess of the thickness of said barrier means.

2. A level transducer comprising a sensor having windings, at least one screen, and barrier means, said windings including a substantially solenoidal drive or exciting winding for establishing a forward or drive field and at least one secondary or sense winding in which a voltage may be induced in the presence of said forward or drive field, said at least one screen being a conductive screen within which eddy currents are generated in the presence of said forward or drive field to establish a counter-field opposing said forward or drive field, said barrier means being interposed between said windings and said at least one screen, so that said at least one screen may be disposed within a region environmentally isolatable from the region in which said windings are located, said substantially solenoidal drive or exciting winding and said at least one secondary or sense winding being substantially coaxial, said at least one screen and said at least one secondary or sense winding being displaceable relative to one another within said forward or drive field so that said at least one secondary or sense winding may be shaded by said at least one screen to a varying extent to thereby vary the voltage induced in said at least one secondary or sense winding, said at least one screen having an axis of symmetry and a surface region which extends substantially circumferentially with respect to said axis of symmetry, said at least one secondary or sense winding being a two-terminal winding and being disposed about the periphery of a notional cylinder which is substantially coaxial with said axis of symmetry of said at least one screen, the relative displacement of said at least one screen and said at least one secondary or sense winding being in the direction of said axis of symmetry of said at least one screen and said axis of said notional cylinder which is substantially coaxial therewith, said drive or exciting winding being disposed about the periphery of a further notional cylinder which is substantially coaxial with said axis of symmetry of said at least one screen, said barrier means being of a relatively poorly conductive material and being defined by a tube within which said at least one screen is axially displaceable, said windings being disposed externally of said tube, said at least one screen comprising the same relatively poorly conductive material as the poorly conductive material of said barrier means, said relatively poorly conductive material being stainless steel, and said at least one screen having a thickness dimension substantially in excess of the thickness of said barrier means.

3. A sensing system comprising a sensor having windings, at least one screen, and barrier means, said windings including a drive or exciting winding for establishing a forward or drive field and at least one secondary or sense winding in which a voltage may be induced in the presence of said forward or drive field, said at least one screen being a conductive screen within which eddy currents are generated in the presence of said forward or drive field to establish a counter-field opposing said forward or drive field, and said barrier means being interposed between said windings and said at least one screen, so that said at least one screen may be disposed within a region environmentally isolatable from the region in which said windings are located, said at least one screen and said at least one secondary or sense winding being displaceable relative to one another within said forward or drive field so that said at least one secondary or sense winding may be shaded by said at least one screen to a varying extent to thereby vary the voltage induced in said at least one secondary or sense winding, said relative displacement of said at least one screen and said at least one secondary or sense winding being limited to substantially a single direction of displacement, said drive or exciting winding being configured so that in the absence of said at least one screen said forward or drive field is substantially even over said at least one secondary or sense winding in said single direction of relative displacement of said at least one screen and said at least one secondary or sense winding, said at least one secondary or sense winding being a two-terminal winding, said at least one screen having a surface region which is substantially parallel to a notional surface defined by said at least one secondary or sense winding, said barrier means being of poorly conductive material, said at least one screen comprising the same relatively poorly conductive material as the poorly conductive material of said barrier means, said poorly conductive material being stainless steel, and said at least one screen having a thickness dimension substantially in excess of the thickness of said barrier means, and the system also comprising means for applying an alternating voltage to said drive or exciting winding, and means for processing the output signal from said at least one secondary or sense winding to provide a signal indicative of the relative disposition of said at least one screen and said at least one secondary or sense winding.

* * * * *